US006957234B1

(12) United States Patent
Steinbach

(10) Patent No.: US 6,957,234 B1
(45) Date of Patent: Oct. 18, 2005

(54) SYSTEM AND METHOD FOR RETRIEVING DATA FROM A DATABASE USING A DATA MANAGEMENT SYSTEM

(75) Inventor: Ralf D. Steinbach, Elmshorn (DE)

(73) Assignee: i2 Technologies US, Inc., Dallas, TX (US)

( * ) Notice: Subject to any disclaimer, the term of this patent is extended or adjusted under 35 U.S.C. 154(b) by 0 days.

(21) Appl. No.: 09/580,327

(22) Filed: May 26, 2000

(51) Int. Cl.[7] .......................... G06F 12/00; G06F 17/30
(52) U.S. Cl. ............................ 707/201; 707/1; 707/10; 707/101; 709/203; 709/217
(58) Field of Search .................. 707/10; 709/201–207, 709/246; 705/28

(56) References Cited

U.S. PATENT DOCUMENTS

| | | | |
|---|---|---|---|
| 5,392,390 A * | 2/1995 | Crozier ........................ 345/762 |
| 5,826,253 A * | 10/1998 | Bredenberg .................... 707/2 |
| 5,931,900 A * | 8/1999 | Notani et al. ................ 709/201 |
| 5,995,945 A * | 11/1999 | Notani et al. ................ 705/28 |
| 6,014,670 A * | 1/2000 | Zamanian et al. .......... 707/101 |
| 6,029,178 A | 2/2000 | Martin et al. ............... 707/201 |
| 6,032,158 A * | 2/2000 | Mukhopadhyay et al. .. 707/201 |
| 6,044,374 A * | 3/2000 | Nesamoney et al. ........ 707/201 |
| 6,192,368 B1 * | 2/2001 | Gerard et al. ........... 707/103 R |
| 6,212,529 B1 * | 4/2001 | Boothby et al. ............ 707/201 |
| 6,222,533 B1 * | 4/2001 | Notani et al. ............... 345/733 |
| 6,256,676 B1 * | 7/2001 | Taylor et al. ............... 709/246 |
| 6,301,589 B1 * | 10/2001 | Hirashima et al. .......... 707/204 |
| 6,308,178 B1 * | 10/2001 | Chang et al. ............... 707/100 |
| 6,332,130 B1 * | 12/2001 | Notani et al. .................. 705/28 |
| 6,339,775 B1 * | 1/2002 | Zamanian et al. .......... 707/101 |
| 6,381,609 B1 * | 4/2002 | Breitbart et al. ........ 707/103 R |
| 6,499,037 B1 * | 12/2002 | Breitbart et al. ........ 707/103 R |
| 2001/0047372 A1 * | 11/2001 | Gorelik et al. .............. 707/514 |
| 2002/0165724 A1 * | 11/2002 | Blankesteijn ................... 705/1 |

OTHER PUBLICATIONS

Ball, M.O. et al. "Supply Chain Infrastructures: System Integration and Information Sharing", SIGMOD Record, vol. 31, No. 1, pp. 61-66, Mar. 2002.*

Yeung, G.C.H., Gruver, W.A. and Kotak, D.B. "A Multi-Agent Approach to Immediate View Maintenance for an Operational Dat Store", Proceedings of the 9th Joint IFSA World Congress and 20th NAFIPS International Conference, pp. 1869-1874 v.4, July 25-28, 2001.*

(Continued)

*Primary Examiner*—Luke S Wassum
(74) *Attorney, Agent, or Firm*—James E. Walton; Brian E. Harris

(57) ABSTRACT

A system (10) for retrieving data from a database (22) using a data management system (20) includes a change retrieval engine (50) that is coupled to the data management system (20). The change retrieval engine (50) determines that data in the database (22) managed by the data management system (20) has been changed and receives information from the data management system (20) identifying one or more categories with which the changed data is associated. The change retrieval engine (50) also accesses a data model (54) to identify data to be retrieved from the database (22) using the data management system (20) according to the received information. The data model (54) identifies data related to the categories. Furthermore, the change retrieval engine (50) requests the data identified by the data model (54) from the data management system (20) and receives the data from the data management system (20). The change retrieval engine (50) stores the data in a data log (74) and communicates a transfer command. The system also includes a change transfer engine (90) that is coupled to the change retrieval engine (50). The change transfer engine (90) receives the transfer command, obtains the data from the data log (74), and communicates the data to an external system (40).

34 Claims, 5 Drawing Sheets

OTHER PUBLICATIONS

Padmos, J. et al. "How i2 Integrates Simulation in Supply Chain Optimization", Proceedings of the 31$^{st}$ Winter Simulation Conference, pp. 1350-1355, Dec. 1999.*

Squire, C. "Data Extraction and Transformation for the Data Warehouse", Proceedings of the 1995 ACM SIGMOD Internationa Conference on Management of Data, pp. 446-447, 1995.*

White, C. "Data Warehousing: Cleaning and Transforming Data", InfoDB, vol. 10, No. 6, pp. 11-12, Apr. 1997.*

White, C.J. "Managing Data Quality and Transformation in a Corporate Information System", Technical Report prepared for Constellar Corporation, Jun. 1997.*

White, C. "Managing Data Transformations", Byte Magazine, Dec. 1997.*

Koch, C., D. Slater and E. Baatz The ABCs of ERP, CIO Magazine, www.cio.com, Dec. 22, 1999.*

White, C.J. "An Analysis-Led Approach to Data Warehouse Design and Development", Database Associates, Version 2, Mar. 2001, downloaded from www.evokesoft.com/pdf/colinWhite.pdf.*

Intellicorp, Inc.; "An Approach to Developing SAP™ R/3® Interfaces: A White Paper—Version 1.3: Feb. 2000;" all.

SAP; "ALE Introduction and Overview;" http://help.sap.com/saphelp_40b/helpdat 6cdd507d11d18ee90000e8366fc2/applet.htm, Feb. 1, 2001.

Notification of Transmittal of the International Search Report or the Declaration (PCT Rule 44.1) mailed Oct. 20, 2003 (6 pages) re International Application No. PCT/US 16962, May 25, 2001.

* cited by examiner

SYSTEM AND METHOD FOR RETRIEVING DATA FROM A DATABASE USING A DATA MANAGEMENT SYSTEM

TECHNICAL FIELD OF THE INVENTION

This invention relates generally to the field of data processing, and more particularly to a system and method for retrieving data from a database using a data management system.

BACKGROUND OF THE INVENTION

Enterprise resource planning (ERP) systems are used to assist manufacturers and other businesses in managing various aspects of their business, including planning products, purchasing parts, maintaining inventories, interacting with suppliers, providing customer service, and tracking orders, as examples. ERP systems are often implemented in software modules that each address one or more of these activities. ERP systems may also include application modules to manage the finances, human resources, and other aspects of a business. An ERP system typically uses or is integrated with a relational database and associated database management system (DBMS), for example, an ORACLE™ database. A relational database includes a set of tables containing data assigned to predefined categories. Each table may include a data category in each column and a unique instance of data in each row (having values for one or more of the data categories). For example, a typical business order entry database might include a table that describes a different customer in each row, where each row has values in one more columns of the table for the customer's name, address, phone number, and other appropriate parameters. Another table might describe product orders using values for the product, customer, date, and sales price.

Although the ERP system typically has full access to the data stored in the database, other systems used by a business may not be able to access the database to obtain desired data. These systems may include, for example, external systems that complement or compete with the ERP system and that use data stored in the database. While it might be possible for such external systems to frequently retrieve all of the data in the database to keep the data that it uses updated, such operations are inefficient since much of the data may not have changed by the retrievals. In addition, allowing such external systems to directly access the database degrades the performance of both the database and the ERP system. These and other disadvantages have made prior techniques for retrieving data from databases inadequate for the needs of many businesses.

SUMMARY OF THE INVENTION

According to the present invention, disadvantages and problems associated with previous systems and methods for data retrieval from a data management system have been substantially reduced or eliminated.

According to one embodiment of the present invention, a system for retrieving data from a database using a data management system includes a change retrieval engine that is coupled to the data management system. The change retrieval engine determines that data in the database managed by the data management system has been changed and receives information from the data management system identifying one or more categories with which the changed data is associated. The change retrieval engine also accesses a data model to identify data to be retrieved from the database using the data management system according to the received information. The data model identifies data related to the categories. Furthermore, the change retrieval engine requests the data identified by the data model from the data management system and receives the data from the data management system. The change retrieval engine stores the data in a data log and communicates a transfer command. The system also includes a change transfer engine that is coupled to the change retrieval engine. The change transfer engine receives the transfer command, obtains the data from the data log, and communicates the data to an external system.

The present invention provide a number of important technical advantages over previous systems and methods. For example, the present invention provides a data access interface system between an ERP system used to manage data associated with a business and an external system that needs access to the data to complement or compete with the ERP system. When a user of the ERP system changes stored data managed by the ERP system, the data access interface system accesses the stored data through the ERP system and communicates the changed data to the external system to keep the data used by the external system updated. The data access interface system may also communicate related unchanged data to the external system. Therefore, once all of the data has been initially transferred to the external system, in response to a change, the present invention provides only the appropriate changed data that it needs (along with any appropriate unchanged but relevant data). This is unlike previous systems that frequently retrieve all of the data in the database regardless of whether the data has changed. Also unlike previous systems and methods, the present invention may use resources provided by the ERP system to access these changes to the data, so that no modifications are required to the ERP system or the database. Furthermore, the present invention may not directly access the underlying database managed by the ERP system, increasing efficiency and avoiding degrading the performance of the ERP system and the database. Other important technical advantages are apparent to those skilled in the art from the following figures, description, and claims.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
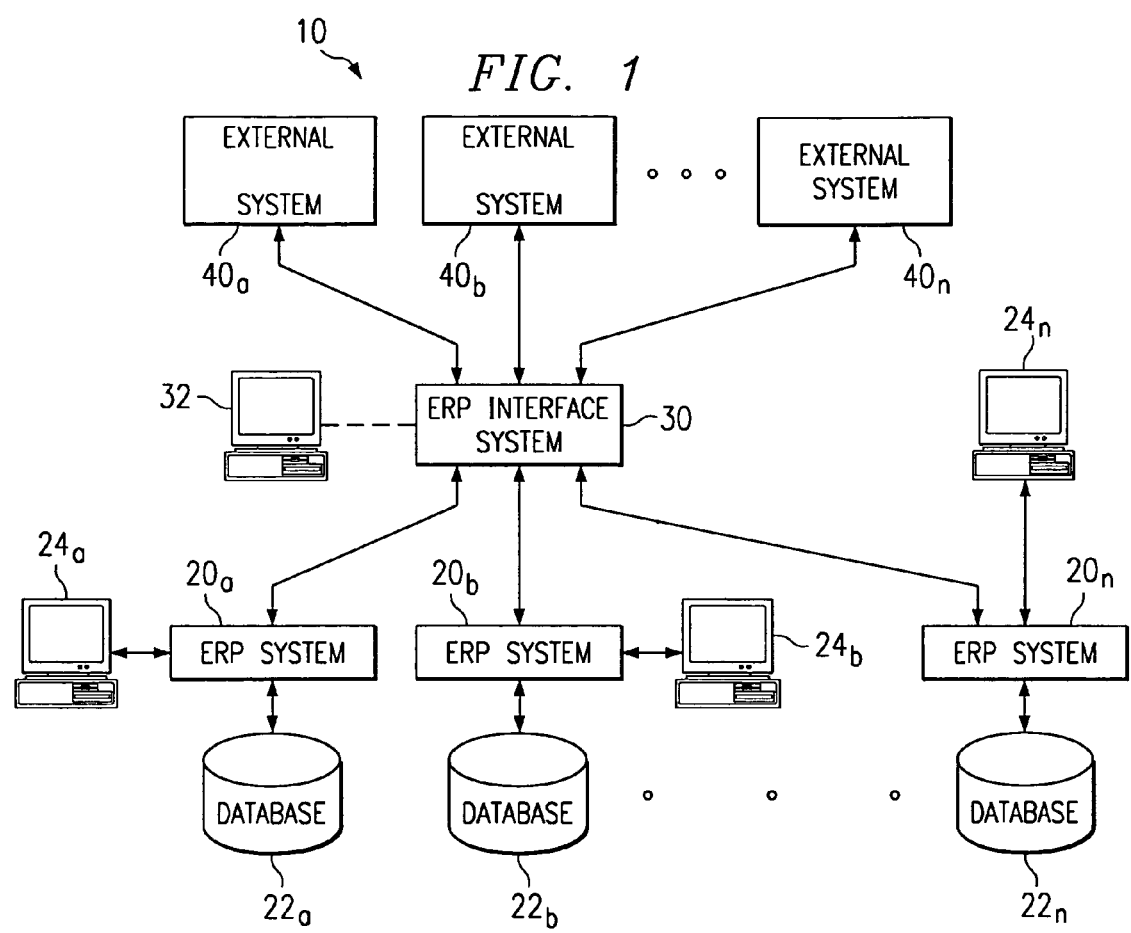
FIG. 1 illustrates an exemplary system for retrieving data from a database using an enterprise resource planning (ERP) system.

FIG. 1 illustrates an exemplary system 10 for retrieving data from a database using an ERP system. System 10 includes one or more enterprise resource planning (ERP)

systems 20, such as the R/3 system produced by SAP™ or any other suitable ERP system. Although ERP systems 20 are primarily discussed, the present invention contemplates any appropriate data management systems instead of or in addition to ERP system 20. A data access interface system 30 serves as an intermediary and provides an interface for communicating information between ERP systems 20 and one or more external systems 40. The components of interface system 30 may operate on one or more computers 32 at one or more locations. External systems 40 may include any appropriate systems for managing data, such as appropriate RHYTHM™ supply chain planning products produced by i2 TECHNOLOGIES™ or any other suitable external system. External systems 20 may also include other ERP systems 20, web servers, or other suitable applications. The term "external system" is meant to include any system capable of using some or all of the data available to ERP systems 20.

External systems 40 may complement the features and operation of ERP systems 20 or, alternatively, may compete with or replace certain features and operations of ERP systems 20. For example, a business may use external systems 40 to work around deficiencies in and add functionality to existing ERP systems 20. Such a business may have become dependent upon ERP systems 20 and cannot easily replace systems 20 and the cost of their complete replacement may be prohibitive. Therefore, a business may add one or more external systems 40 and use the interface system 30 of the present invention as an interface between the existing ERP systems 20 and the added external systems 40.

ERP systems 20 each have one or more associated databases 22, such as ORACLE™ relational databases or any other suitable database and associated management systems (DBMS), that store data for processing by ERP systems 20. Databases 22 may be separate from or integrated with ERP systems 20. Some of the data stored in databases 22 and available to ERP system 20 may be used by external systems 40, and database interface system 30 facilitates the transfer of this data from ERP systems 20 to external systems 40. ERP systems 20, data access interface system 30, and external systems 40 may communicate in any suitable manner using any suitable wireline, wireless, or other suitable communication links. ERP systems 20 may each be accessed by one or more users 24, which may be autonomous or associated with one or more human operators. Users 24 have access to the data used by ERP systems 20 and may have the, ability to create, modify, or delete some or all of the data stored in databases 22. Instead or in addition, data stored in databases 22 may be created, modified, or deleted by ERP system in conjunction with their operation. Subsequent references to "changes" to the data in database 22 are meant to encompass the creation, modification, or deletion of the data. Since at least some data stored in databases 22 and used by ERP systems 20 is communicated to and used by external systems 40, the data communicated to external systems 40 needs to be updated in response to changes being made to the data in databases 22. Interface system 30 performs this function by monitoring ERP systems 20 for changes in the data and communicating the changes (and any other relevant data) to external systems 40. In one embodiment, the communication of changes occurs at least once per second; however, larger or smaller data transfer frequencies are also included within the scope of the present invention.

Figure 2:
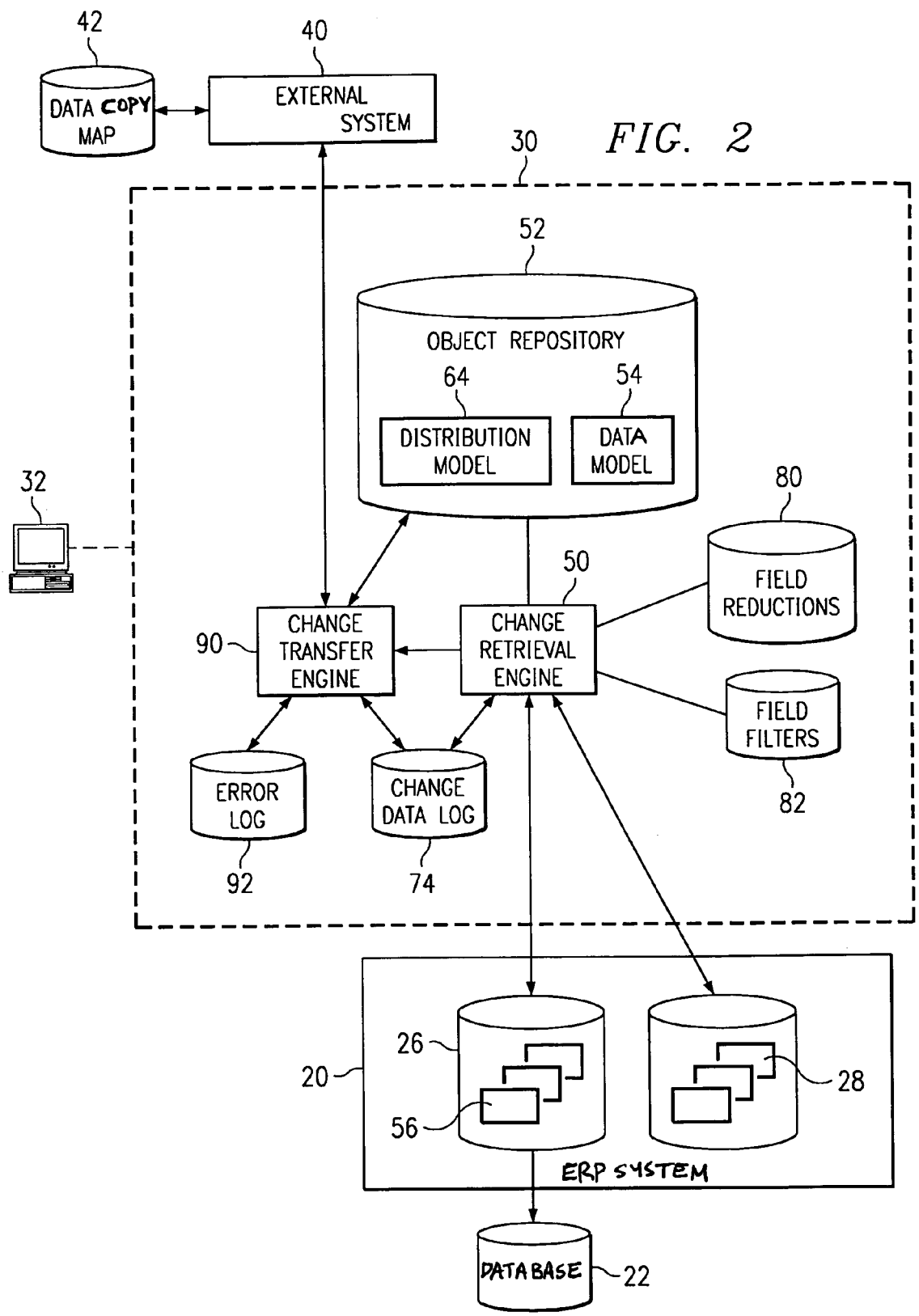
FIG. 2 illustrates an exemplary ERP system and an exemplary data access interface system in further detail.

FIG. 2 illustrates exemplary ERP and data access interface systems 20 and 30, respectively in further detail. ERP system 20 includes one or more business object databases 26 which define business objects used in ERP system 20 and which relate the business object to data stored in tables of database 22. For example, materials, customers, vendors, bills of materials (BOM), purchase orders, sales orders, material stocks, financial documents, or any other suitable items may be modeled as business objects and defined in business object database 26 by links to data tables in database 22. Each business object may be associated with a main table for that business object in database 22. One or more instances of the business object may be identified by a key value in the main table. For example, a particular type of material that is an instance of the business object "MATERIAL" may be identified by a key value associated with a material number for that material in the main table. Furthermore, each main table may be associated with one or more sub-tables containing further data associated with the instances of the business object. Although the terms "objects" and "instances" are used to describe the method by which the data is organized in ERP system 20, any other appropriate technique for placing the data in relevant categories or otherwise organizing the data may also be used.

When a user 24 of ERP system 20 changes data associated with a particular business object (or when the data is otherwise changed), ERP system 20 changes the data in one or more appropriate tables in database 22. Therefore, user 24 typically does not access database 22, but instead enters changes in ERP system 20 which then makes corresponding changes in database 22 according to the interface between ERP system 20 and database 22. ERP system 20 tracks changes made to the data in database 22 by creating one or more change documents 28 when data is changed. As an example only, and not by way of limitation, the SAP™ R/3 system creates change document tables labeled "CDHDR" and "CDPOS" to track changes made to the data in database 22. Change documents 28 typically indicate the business object(s) associated with the changed data, the main table(s) in database 22 associated with the business object(s), the key value(s) of particular instances of a business object associated with the changed data, and any other appropriate information (such as more specific information about the location and content of the data that was changed).

ERP system 20 typically provides a user interface that makes change documents 28 accessible from an external source, such as interface system 30. Interface system 30 is coupled to this user interface and is able to retrieve information from change documents 28 as they are created or updated. It may often be the case that external system 40 desires more information related to a change in data at ERP system 20 than just the actual data that was changed. For example, external system 40 may need information from tables in database 22 that contain data related to the changed data, but that were not themselves changed. Therefore, interface system 30 preferably does more than collect the data that was changed and communicate the changed data to external system 40, as described below.

In an exemplary embodiment, interface system 30 obtains information related to the changed data from change document 28. This information enables interface system 30 to collect all of the desired data that is related to the change from database 22 using ERP system 20. In this embodiment, a change retrieval engine 50 of interface system 30 obtains three types of information from change document 28: a business object associated with the changed data, a main table in database 22 associated with the business object, and a key value of particular instance of the business object. For example, the information obtained from a change document 28 associated with a change affecting a particular material may include the business object "MATERIAL", the main table "MARA", and the key value "1000" (which corresponds to the particular material). Based on this information, change retrieval engine 50 determines and retrieves the data that external systems 40 have specified to be relevant to the change. In one embodiment, to determine the relevant data to retrieve, retrieval engine 50 accesses an object repository 52 that includes a data model 54 and a distribution model 64. Data model 54 defines what information should be retrieved from database 22 using ERP system 20 and distribution model 64 defines where and in what manner the retrieved data is to be sent to external systems 40.

Figure 3:
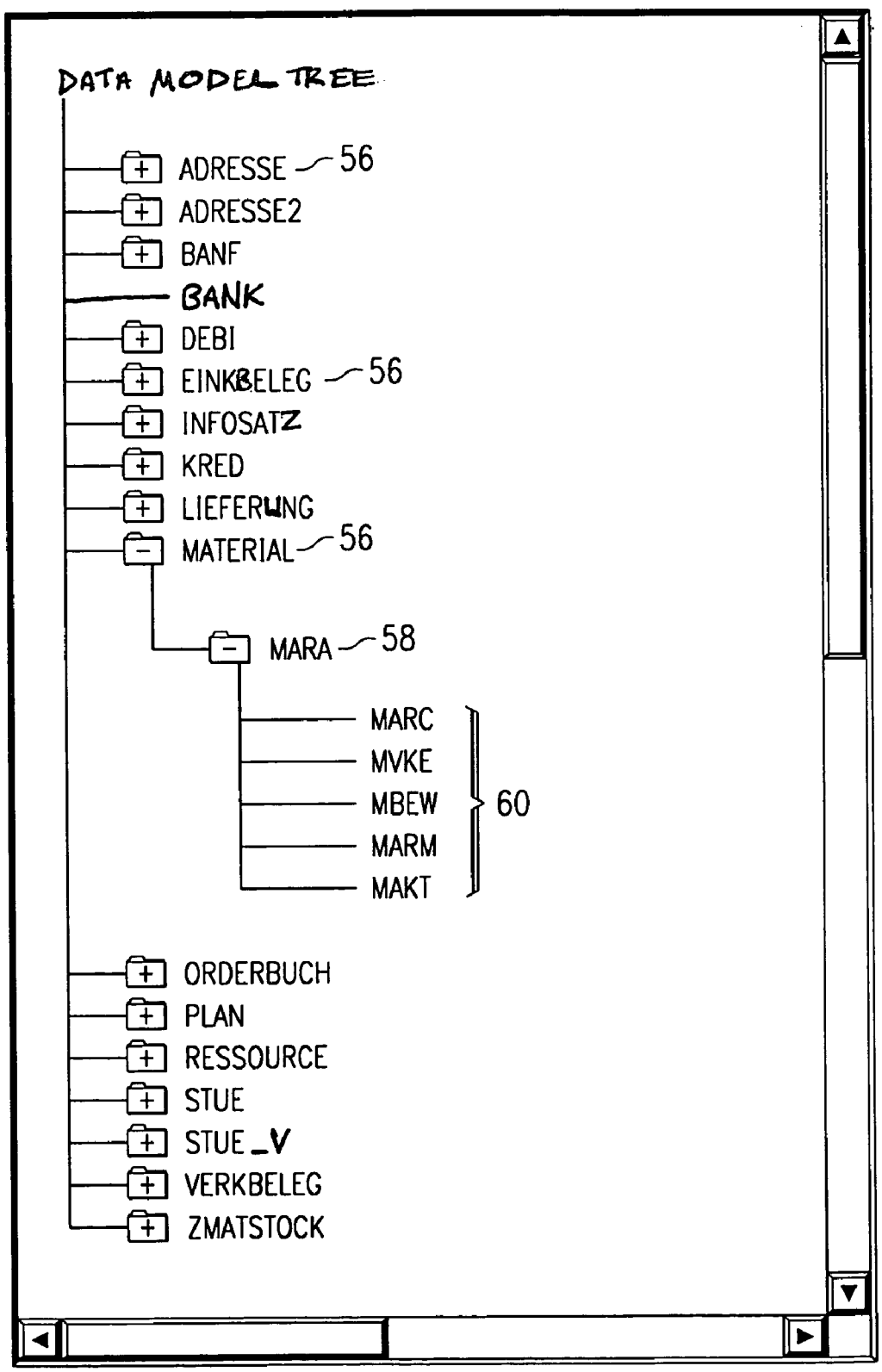
FIG. 3 illustrates an exemplary data model of a data access interface system.

FIG. 3 illustrates an exemplary data model 54. Data model 54 may have a tree structure that includes one or more levels. In one embodiment, the first level identifies one or more business object 56 that correspond to business objects defined in ERP system 20. As described above, ERP system 20 organizes the data in database 22 by associating the data with one or more business objects defined in business object database 26. The second level of data model 54 identifies a main table 58 that is associated with each business object 56 and stored in database 22. The corresponding main table 58 in database 22 may contain an association of one or more key values with one of more instances of business object 56. For example, the main table 58 in database 22 that is associated with "MATERIAL" business object 56 may be "MARA" main table 58. "MARA" main table 58 may contain associations of one or more key values with one or more types of materials that are instances of "MATERIAL" business object 56. The third level of data model 54 may identify one or more sub-tables 60 associated with each main table 58. For example only, and not by way of limitation, "MARA" main table 58 may have the following associated sub-tables 60: "MARC" sub-table 60, "MVKE" sub-table 60, "MBEW" sub-table 60, "MARM" sub-table 60, "MAKT" sub-table 60, and any other suitable sub-table 60. Sub-tables 60 correspond with sub-tables 60 in database 22 that include data about the instances of each business object 56. For example, "MARC" sub-table 60 in database 22 may include information about the manufacturing plants at which the different types of materials are used or manufactured.

Data model 54 typically includes the business objects 56 that ERP systems 20 associates with data that is useful to one or more of external systems 40. Likewise, sub-tables 60 identified with each business object 56 are typically the sub-tables 60 in database 22 containing the particular information associated with a business object 56 with which external systems 40 are concerned. When retrieval engine 50 has obtained the business object, main table, and key value information from change document 28, retrieval engine 50 uses this information in conjunction with data model 54 to determine one or more sub-tables 60 identified in data model 54 from which to obtain data. The business object and/or main table information may be matched with business objects 56 and/or main tables 58 identified in data model 54 to determine sub-tables 60 from which data is to be retrieved. As is described below, the key value is then used to determine which data in the sub-tables 60 is relevant. In addition, selected business objects 56 and/or tables 58 or 60 identified in data model 54 may be de-selected so that no data is retrieved for these business objects 56 and/or tables 58 or 60 during the time they are de-selected.

Figure 4:
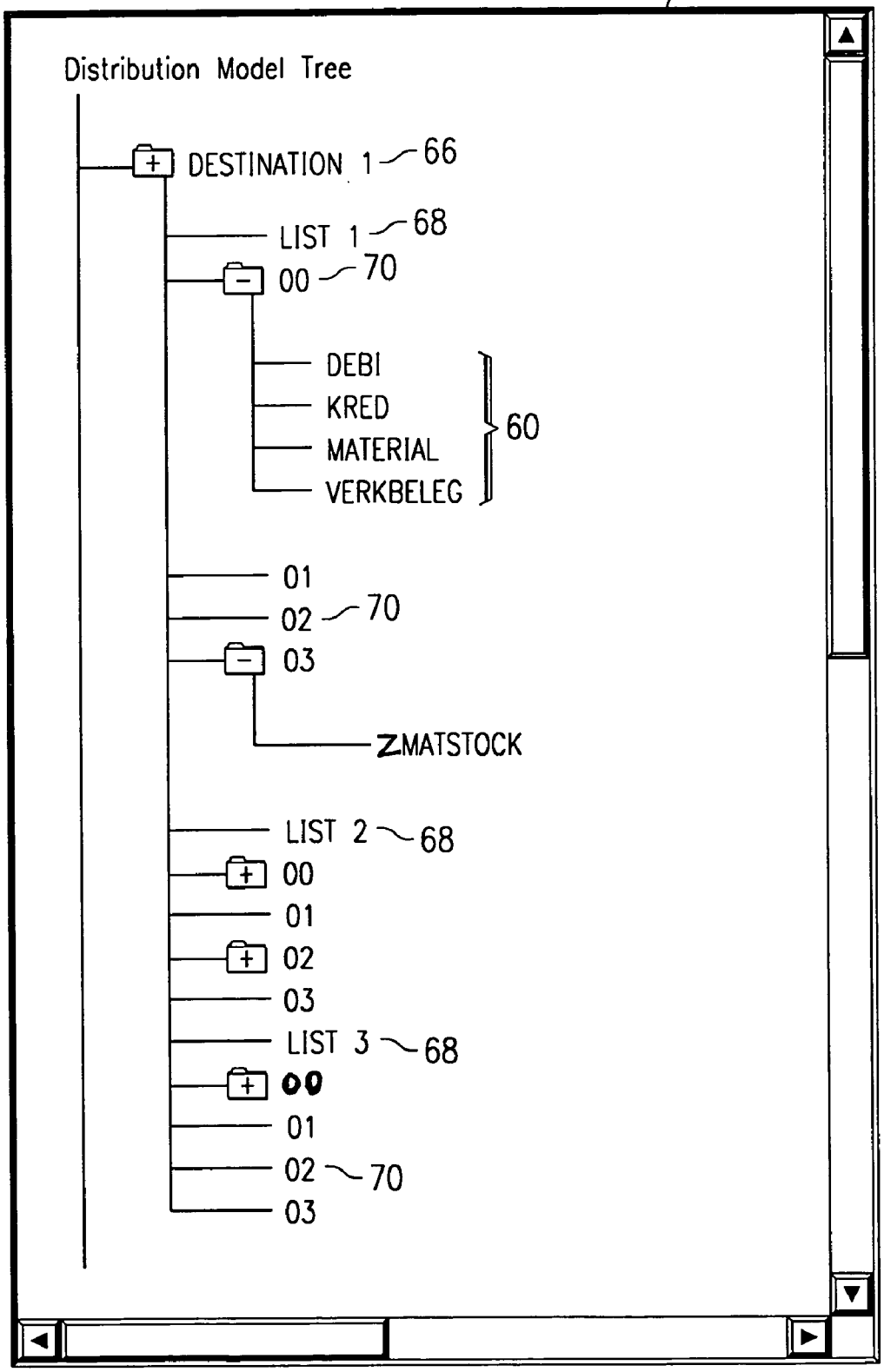
FIG. 4 illustrates an exemplary distribution model of the data access interface system.

FIG. 4 illustrates an exemplary distribution model 64. Distribution model 64 includes one or more distribution destinations 66, each of which describe destination information associated with an external system 40 to which interface system 30 may communicate data. For example, destinations 66 may each represent or be associated with addresses of one or more external system 40 to which interface 30 may communicate data. In an exemplary embodiment, destinations 66 are remote function call (RFC) destinations. Although only a single destination 66 is illustrated in FIG. 4, other destinations 66 may also be included in distribution model 64. Each destination 66 may be associated with one or more delivery lists 68, and each destination 66 may include one or more serialization groups 70. Delivery lists 68 are used to link a business object 56 to multiple destinations 66. Serialization groups 70 may identify one or more business objects 56, indicating that data retrieved by interface system 30 relating to the business objects 56 should be communicated to the destination 66 associated with the serialization group 70.

If more than one business object 56 is identified in a serialization group 70, the data associated with the identified business objects 56 is communicated in series to the indicated destination 66 in the order that the changes were made to the business objects 56 in database 22 by ERP system 20. ERP system 20 ensures that changes made to the data in database 22 occur in a logical order. For example, if a user of ERP system 20 creates a new type of material (for example, an instance of the MATERIAL business object 56) and also creates a purchase order for the material, ERP system 20 ensures that the creation of the new type of material occurs before the creation of the purchase order in database 22. This logical ordering is maintained when the changed data and any other relevant data is communicated to external systems 40 by including the associated business objects 56 in the same serialization group 70. On the other hand, if the logical time sequence in which the changed data is communicated needs to be broken, the associated business objects 56 may be included in different serialization groups 70. The data associated with different serialization groups 70 assigned to a particular destination 66 may be communicated to destination 66 in parallel (at substantially the same time). Furthermore, the data in a particular serialization group may be communicated to different destinations 66 in parallel. It should be understood that although a particular distribution model 64 is described, any other appropriate method of distributing data retrieved from database 22 using ERP system 20 is also included within the scope of the present invention.

Referring again to FIG. 2, once change retrieval engine 50 has determined the data to retrieve according to data model 54, retrieval engine 50 requests the data from ERP system 20. For example, retrieval engine 50 may request data in selected sub-tables 60 that is related to a particular instance of a business object 56 (the data being identified in the sub-tables 60 by a key number). ERP system 20 then retrieves the requested data from database 22 and communicates the data to retrieval engine 50. In an exemplary embodiment, retrieval engine 50 may also use one or more field reductions 80 and field filters 82 to prevent unwanted data from being retrieved from ERP system 20. This reduction in the amount of data transferred from ERP system 20 to interface system 30 may increase the overall performance of ERP system 20 and interface system 30. After determining the data to be retrieved from database 22 using ERP system 20 according to data model 54, retrieval engine 30 obtains field reductions 80 and field filters 82 stored at interface system 30 or any other appropriate location and applies field reductions 80 and field filters 82 to the data indicated by data model 54. Field reductions 80 indicate to retrieval engine 50 which fields of a particular table do not need to be retrieved from database 22 using ERP system 20 for a particular external system 40. For example, although an exemplary data model 54 might indicate that data from "MARC" sub-table 60 should be retrieved when a change has been made affecting "MATERIAL" business object 56, field reduction 80 might indicate that only certain fields of "MARC" sub-table 60 should (or should not) be retrieved. Some fields may never be used by external system 40 and thus it does not matter if they have been changed. Each external system 40 may have associated field reductions 80, since each external system 40 may require different types of information and consider different types of information to be relevant.

The data to be retrieved from database 22 using ERP system 20 may also be filtered using field filters 82. Field filters 82 indicate to retrieval engine 50 which data is to be retrieved from the fields not filtered out according to field reductions 82. Field filters 82 indicate whether the data in these remaining fields is to be retrieved according to the content of the data in the fields. For example, field filters 82 may indicate that only data created after a certain date or related to a certain business operation should be retrieved. Field filters 82 may use Boolean logic or any other appropriate to specify the filtering criteria to be applied. Furthermore, although field reductions 80 and field filters 82 are described as being used to guide the retrieval of data by retrieval engine 50, field reductions 80 and field filters 82 may also be applied to eliminate data already retrieved by retrieval engine 50 before the data is communicated to external system 40. Any other appropriate data filtering or selection techniques may be used instead of or in addition to application of field reductions 80 and field filters 82.

Retrieval engine 50 retrieves the data from ERP system 20 according to data model 54 (and field reductions 80 and field filters 82, if appropriate). Retrieval engine 50 may request the data using a remote function call or any other appropriate method of communicating with ERP system 20. ERP system 20 may then communicate the requested data to retrieval engine 50. The data retrieval may be performed on a substantially "real-time" basis, so that changes made by a user 24 are retrieved by interface system 30 at substantially the same time that ERP system 20 makes the changes in database 22. For example, a user 24 of ERP system 20 may make changes to data using ERP system 20, and ERP system 20 may generate one or more change documents 28 to reflect the changes. ERP system 20 then changes the data in database 22 to reflect the changes. At substantially the same time, change retrieval engine 50 may request the changed data and ERP system 20 may communicate the changed data to retrieval engine 50. Therefore, the changed data (and any other relevant data) collected by retrieval engine 50 may closely reflect the current state of the data in database 22. This substantially "real-time" data collection may be important in applications where data is frequently being changed by users 24, as a result of processing in ERP system 20, or in any other appropriate manner.

The data retrieved by retrieval engine 50 may be saved as one or more data groups in a data log 74 according to the destination 66 of the data (as specified in distribution model 64). For example, all of the data to be communicated to a particular external system 40 may be grouped together. These destination-specific data groups may be further divided into serialization groups 70 according to distribution model 64. The destination 66 associated with each external system 40 to which the information is to be communicated may also be saved with the data in data log 74. Alternatively, this information may be obtained from object repository 52 when the data is communicated to external systems 40. The data retrieved from database 22 using ERP system 20 may be stored in any appropriate manner.

Once the data has been stored in data log 74, retrieval engine 50 communicates a transfer message to a change transfer engine 90 indicating that there is data in data log 74 to be communicated to one or more external systems 40. Transfer engine 90 may operate independently of retrieval engine 50, so that the communication of the collected data (and any problems with the communication) do not interfere with the retrieval of changes from database 22 using ERP system 20. This independent operation is especially advantageous when changes are made at frequent intervals in database 22 using ERP system 20 and retrieval engine 50 needs to accurately and quickly track these changes. When transfer engine 90 receives a transfer message from retrieval engine 50, transfer engine 90 accesses data log 74 and retrieves the data to be communicated to the one or more external systems 40. As described above, this data may be grouped in data log 74 according to the destination 66 and according to assigned serialization groups 70. In this case, transfer engine 90 retrieves the data in these groups.

In an exemplary embodiment, transfer engine 90 creates a separate transfer process for the data associated with each destination 66. If the data associated with a particular destination 66 is divided into serialization groups 70, then a transfer process may be created for each serialization group 70. Such separate transfer processes may allow for parallel (substantially simultaneous) communication of the various data groups. For example, data may be communicated to a first external system 40a at substantially the same time that data is being communicated to a second external system 40b. Furthermore, data in different serialization groups 70 may be sent in parallel to the same planning engine 40. As described above, data in a serialization group 70 is communicated in series in the order in which the data was changed in database 22. The communication of the data from transfer engine 90 to external systems 40 may be accomplished using any appropriate communication technique, including but not limited to remote function calls. When external system 40 receives data from transfer engine 90, external system 40 may use the data in any appropriate manner. External system 40 may also include a data copy map 42 that indicates the relationship of data from ERP system 20 with data in external system 40 and identifies where the information communicated by transfer engine 90 is to be stored in external system 40.

In one embodiment, if transfer engine 90 is unsuccessful in communicating data to an external system 40, transfer engine 90 creates an error log 92 that indicates which data was not sent to the external system 40. For example, error log 92 may indicate that the data associated with one or more serialization groups 70 or one or more destinations 66 was not communicated to an external system 40. The next time transfer engine 90 receives a transfer command from retrieval engine 50 indicating the existence of new data in data log 74, transfer engine 90 may determine if there were any errors in the previous data transfer. If there were errors, transfer engine 90 may then attempt to communicate the previous data, which may be saved in data log 74, error log 92, or any other appropriate location, before attempting to communicate the new change data in data log 74. For example, if the data in a serialization group 70 is not sent to external system 40 due to a communication fault, transfer engine 90 writes an error log 92 indicating this failed attempt. Transfer engine 90 then receives a subsequent transfer command indicating that new data associated with the serialization group 70 has been retrieved from database 22 using ERP system 20 and should be communicated to external system 40. Transfer engine 90 communicates the data in serialization group 70 that was unable to be communicated before, and then transfer engine 90 communicates the new data associated with the same serialization group 70. Therefore, the order of the change data is maintained so that external system 40 receives changes and associated data in the correct order. This may be particularly important when frequent changes are made to the data in database 22 using ERP system 20.

Figure 5:
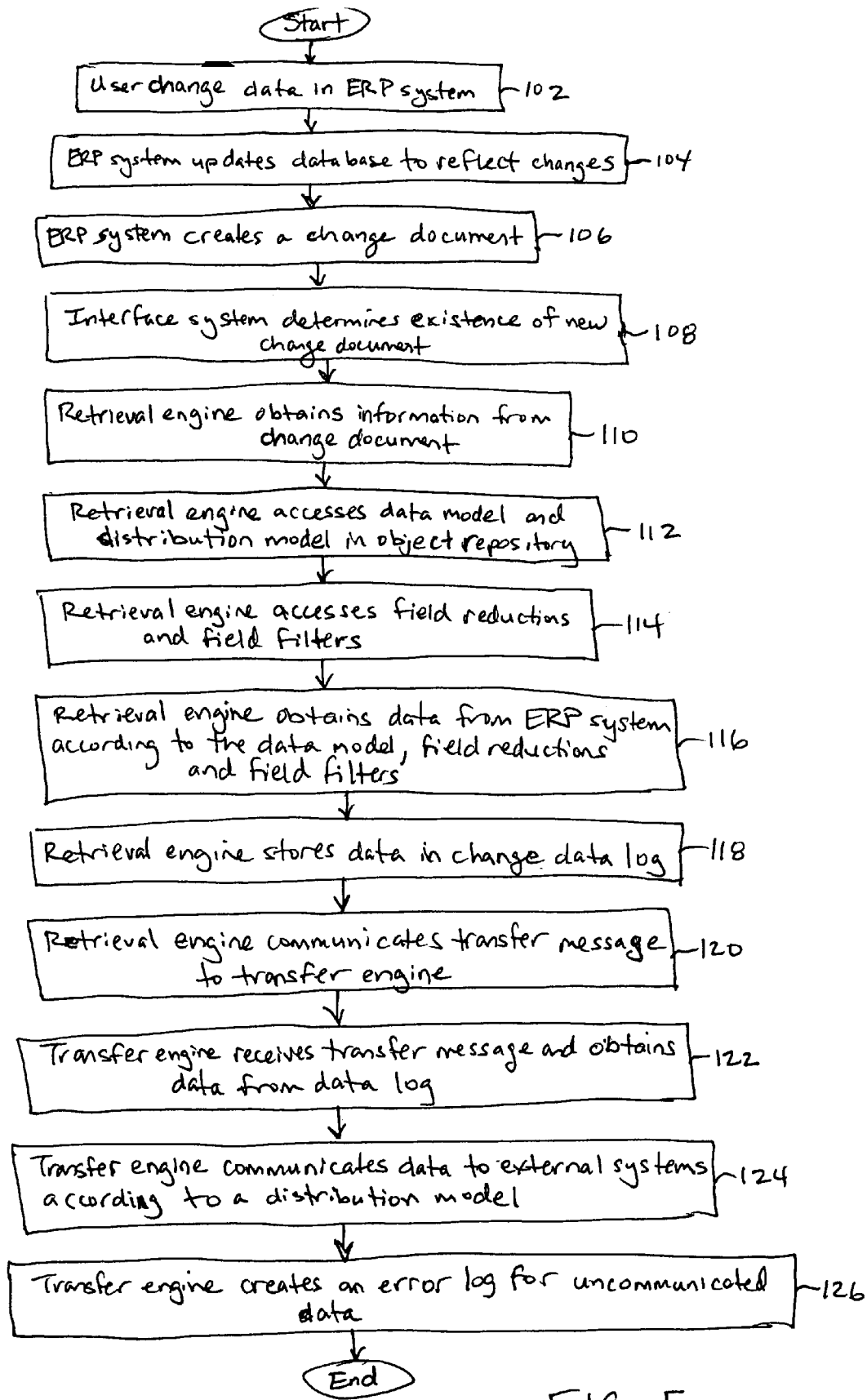
FIG. 5 illustrates an exemplary method of retrieving data from a database using an ERP system.

FIG. 5 illustrates an exemplary method for retrieving data from database 22 using ERP system 20. The method begins at step 102 when a user 24 of ERP system 20 changes data using ERP system 20. For example, the user 24 may change data associated with a particular material used in a manufacturing process. At step 104, ERP system 20 updates the data stored in database 22 to reflect the changes. ERP system 20 creates one or more change documents 28 at step 106, indicating the changes made by the user 24. ERP system 20 may create change document 28 at substantially the same time that it is updating database 22 or at any other appropriate time. At step 108, interface system 30 determines that a new change document 28 has been created or that new information associated with changed data has been added to a previously-created change document 28. Interface system 30 may determine the existence of change document 28 by monitoring ERP system 20, by receiving a message from ERP system 20 indicating the creation (or modification) of change document 28, or in any other appropriate manner.

At step 110, retrieval engine 50 of interface system 30 obtains information from change document 28 that indicates which data has been changed using ERP system 20. For example only and not by way of limitation, this information may include the name of a business object 56, a main table 58 associated with the business object 56, and a key value associated with an instance of the business object 56 for which data was changed. At step 112, retrieval engine 50 accesses data model 54 and distribution model 64 in object repository 52 and uses the information obtained from change document 28 to determine the data to retrieve from ERP system 20 and where the data is to be communicated. For example, based on the name of a business object 56, the main table 58 associated with business object 56, and a key value identifying an instance of the business object 56, retrieval engine 50 may determine one or more sub-tables 60 from which data should be obtained. At step 114, retrieval engine 50 may also access one or more field reductions 80 and field filters 82 that limit the data to be retrieved (or eliminate data already retrieved) from ERP system 20 as described above.

Retrieval engine 50 obtains data from ERP system 20 at step 116 according to data model 54, field reductions 80, and field filters 82. For example, retrieval engine 50 may request data associated with a particular key value in several sub-tables 60 and may limit the data retrieved from the sub-tables 60 using field reductions 80 and field filters 82. Retrieval engine 50 may obtain the relevant data from ERP system 20 using a remote function call or any other appropriate communication technique. Retrieval engine 50 stores the data obtained from ERP system 20 in change data log 74 at step 118. As described above, the data may be stored according to delivery lists 68 and serialization groups 70 as indicated by distribution model 64. The destination 66 associated with delivery lists 68 and groups 70 may also be stored in data log 74. After storing the data in data log 74, retrieval engine 50 communicates a transfer command to transfer engine 90 at step 120. At step 122, transfer engine 90 receives the transfer command and obtains the data from data log 74. Transfer engine 90 communicates this data at step 124 to one or more external systems 40 according to distribution model 64. As described above, transfer engine 90 may communicate the data in serialization groups 70. Transfer engine 90 may communicate the data to destinations 66 identified in data log 74 or transfer engine 90 may access distribution model 64 in object repository 52 to determine destinations 66 for the data. If transfer engine 90 is unable to communicate some or all of the data to external systems 40, transfer engine 90 may create an error log 92 at step 126 to identify the communication error for later communication attempts.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for retrieving data from a database using a data management system, comprising:
   a change retrieval engine coupled to the data management system and operable to:
      determine that data in the database managed by the data management system has been changed;
      receive information from the data management system identifying a particular business object with which the changed data is associated, a main table including data associated with the particular business object, and key values identifying a plurality of instances of the particular business object, each of the plurality of instances of the particular business object being associated with at least a portion of the changed data;
      access a data model specifying, for the particular business object, references to plural tables associated with the particular business object and managed by the data management system that include data related to the plural instances of the particular business object, the data related to each instance being identifiable in one or more of the plural tables by the key value identifying that instance;
      wherein the plural instances of the particular business object represent different subsets of data related to the particular business object such that the data related to different ones of the plural instances is at least partially different data;
      identify, according to the data model and the information received from the data management system, the plural tables associated with the particular business object
      for each of the plural instances of the particular business object, use the key value associated with that instance to identify, from the plural tables associated with the particular business object, the data in one or more of the plural tables that is related to that instance;
      request from the data management system data to be retrieved included in the plural tables identified according to the data model, the requested data to be retrieved including at least a portion of the data identified as related to the plural instances of the particular business object; and
      receive the data from the data management system.

2. The system of claim 1, wherein:
the change retrieval engine is further operable to:
store the data received from the data management system in a data log; and
communicate a transfer command; and
the system further comprises a change transfer engine coupled to the change retrieval engine and operable to:
receive the transfer command;
obtain the data from the data log; and
communicate the data to an external system distinct from the data management system.

3. The system of claim 2, wherein:
the data management system comprises an enterprise resource planning (ERP) system; and
the external system comprises an external planning system.

4. The system of claim 2, wherein the change retrieval engine is further operable to:
access a distribution model to determine one or more serialization groups into which the data identified by the data model is to be divided; and
store the data received from the data management system in the data log according to the serialization groups.

5. The system of claim 4, wherein the change retrieval engine is further operable to:
access the distribution model to determine destination information for one or more external systems to which the data in the serialization groups is to be communicated; and
store the destination information for the one or more external systems with the serialization groups in the data log.

6. The system of claim 5, wherein the change transfer engine is further operable to communicate the serialization groups to the external systems identified by the destination information, the data in each serialization group communicated to the associated external system in an order that the data in the database was changed.

7. The system of claim 4, wherein the change transfer engine is further operable to:
access the distribution model to determine destination information for one or more external systems to which the data in the serialization groups is to be communicated; and
communicate the serialization groups to the appropriate external systems using the destination information, the data in each serialization group communicated to the associated external system in an order that the data in the database was changed.

8. The system of claim 2, wherein the change transfer engine is further operable to:
create an error log if data is not communicated to an external system;
receive a second transfer command indicating additional data has been stored in the data log; and
communicate the data associated with the error to the external system before communicating the additional data to the external system.

9. The system of claim 1, wherein the change retrieval engine is further operable to monitor the data management system to determine when a change document is created, the change document indicating that data managed by the data management system has been changed.

10. The system of claim 1, wherein the change retrieval engine is further operable to receive a message from the data management system indicating that data managed by the data management system has been changed.

11. The system of claim 1, wherein the particular business object is identified in the data model by a business object name.

12. The system of claim 1, wherein the particular business object is identified in the data model by a name of the main table of data associated with the particular business object in the data management system.

13. The system of claim 1, wherein the change retrieval engine is further operable to:
apply field reductions to the tables identified according to the data model, the field reductions indicating one or more fields of the tables containing desired data; and
request from the data management system data from the fields indicated as containing desired data.

14. The system of claim 1, wherein the change retrieval engine is further operable to:
apply field filters to the tables identified according to the data model, the field filters indicating the desired data in the tables; and
request from the data management system the desired data.

15. A method for retrieving data from a database using a data management system, comprising:
determining that data in the database managed by the data management system has been changed;
receiving information from the data management system identifying a particular business object with which the changed data is associated, a main table including data associated with the particular business object, and key values identifying a plurality of instances of the particular business object, each of the plurality of instances of the particular business object being associated with at least a portion of the changed data;
accessing a data model specifying, for the particular business object, references to plural tables associated with the particular business object and managed by the data management system that include data related to the plural instances of the particular business object, the data related to each instance being identifiable in one or more of the plural tables by the key value identifying that instance;
wherein the plural instances of the particular business object represent different subsets of data related to the particular business object such that the data related to different ones of the plural instances is at least partially different data;
identifying, according to the data model and the information received from the data management system, the plural tables associated with the particular business object;
for each of the plural instances of the particular business object, using the key value associated with that instance to identify, from the plural tables associated with the particular business object, the data in one or more of the plural tables that is related to that instance;
requesting from the data management system data to be retrieved included in the plural tables identified according to the data model, the requested data to be retrieved including at least a portion of the data identified as related to the plural instances of the particular business object; and
communicating the data to an external system distinct from the data management system.

16. The method of claim 15, wherein:
the data management system comprises an enterprise resource planning (ERP) system; and the external system comprises an external planning system.

17. The method of claim 15, wherein determining that data managed by the data management system has been changed comprises monitoring the data management system to determine when a change document is created, the change document indicating that data managed by the data management system has been changed.

18. The method of claim 15, wherein determining that data managed by the data management system has been changed comprises receiving a message from the data management system indicating that data managed by the data management system has been changed.

19. The method of claim 15, wherein the particular business object is identified in the data model by a business object name.

20. The method of claim 15, wherein the particular business object is identified in the data model by a name of a main table of data associated with the business object in the data management system.

21. The method of claim 15, wherein the method further comprises applying field reductions to the tables identified according to the data model, the field reductions indicating one or more fields of the tables from which to request data from the data management system.

22. The method of claim 15, wherein the method further comprises applying field filters to the tables identified by the data model, the field filters indicating the relevant data in the tables to be requested from the data management system.

23. The method of claim 15, further comprising:
accessing a distribution model to determine one or more serialization groups into which the data identified by the data model is to be divided;
accessing the distribution model to determine destination information for one or more external systems to which the data in the serialization groups is to be communicated; and
communicating the serialization groups to the external systems identified by the destination information, the data in each serialization group communicated to the associated external system in an order that the data in the database was changed.

24. The method of claim 15, further comprising:
creating an error log if data is not communicated to an external system; and
communicating the data associated with the error to the external system before communicating additional data received from the data management system to the external system.

25. A system for retrieving data from a database using a data management system, comprising:
a database operable to store data;
a data management system operable to access and change the data in the database; and
a data access interface system operable to:
receive information from the data management system identifying a particular business object with which the changed data is associated, a main table including data associated with the particular business object, and key values identifying a plurality of instances of the particular business object, each of the plurality of instances of the particular business object being associated with at least a portion of the changed data;
access a data model specifying, for the particular business object, references to plural tables associated with the particular business object and managed by the data management system that include data related to the plural instances of the particular business object, the data related to each instance being identifiable in one or more of the plural tables by the key value identifying that instance;
wherein the plural instances of the particular business object represent different subsets of data related to the particular business object such that the data related to different ones of the plural instances is at least partially different data;
identify, according to the data model and the information received from the data management system, the plural tables associated with the particular business object;
for each of the plural instances of the particular business object, use the key value associated with that instance to identify, from the plural tables associated with the particular business object, the data in one or more of the plural tables that is related to that instance;
request from the data management system data to be retrieved included in the plural tables identified according to the data model, the requested data to be retrieved including at least a portion of the data identified as related to the plural instances of the particular business object; and
communicate the data to an external system distinct from the data management system.

26. Software for retrieving data from a database using a data management system, the software being embodied in computer-readable media and when executed operable to:
determine that data in the database managed by the data management system has been changed;
receive information from the data management system identifying a particular business object with which the changed data is associated, a main table including data associated with the particular business objects, and key values identifying a plurality of instances of the particular business object, each of the plurality of instances of the particular business object being associated with at least a portion of the changed data;
access a data model specifying, for the particular business object, references to plural tables associated with the particular business object and managed by the data management system that include data related to the plural instances of the particular business object, the data related to each instance being identifiable in one or more of the plural tables by the key value identifying that instance;
wherein the plural instances of the particular business object represent different subsets of data related to the particular business object such that the data related to different ones of the plural instances is at least partially different data;
identify, according to the data model and the information received from the data management system, the plural tables associated with the particular business object;
for each of the plural instances of the particular business object, use the key value associated with that instance to identify, from the plural tables associated with the particular business object, the data in one or more of the plural tables that is related to that instance;
request from the data management system data to be retrieved included in the plural tables identified according to the data model, the requested data to be retrieved including at least a portion of the data identified as related to the plural instances of the particular business object;

receive the requested data from the data management system; and communicate the received data to an external system distinct from the data management system.

27. The software of claim 26, further operable to monitor the data management system to determine when a change document is created, the change document indicating that data managed by the data management system has been changed.

28. The software of claims 26, further operable to receive a message from the data management system indicating that data managed by the data management system has been changed.

29. The software of claims 26, wherein the particular business object is identified in the data model by a name of a main table of data associated with the business object in the data management system.

30. The software of claims 26, further operable to:

apply field reductions to the tables identified according to the data model, the field reductions indicating one or more fields of the tables containing desired data; and request from the data management system data from the fields indicated as containing desired data.

31. The software of claims 26, further operable to:

apply field filters to the tables identified according to the data model, the field filters indicating the desired data in the tables; and request from the data management system the desired data.

32. The software of claims 26, further operable to:

access a distribution model to determine one or more serialization groups into which the data identified by the data model is to be divided; and store the data received from the data management system in the data log according to the serialization groups.

33. The software of claims 26, further operable to:

create an error log if data is not communicated to an external system;

receive a second transfer command indicating additional data has been stored in the data log; and communicate the data associated with the error to the external system before communicating the additional data to the external system.

34. A system for retrieving data from a database using a data management system, comprising:

means for determining that data in the database managed by the data management system has been changed;

means for receiving information from the data management system identifying a particular business object with which the changed data is associated, a main table including data associated with the particular business object, and key values identifying a plurality of instances of the particular business object, each of the plurality of instances of the particular business object being associated with at least a portion of the changed data;

means for accessing a data model specifying, for the particular business object, references to plural tables associated with the particular business object and managed by the data management system that include data related to the plural instances of the particular business object, the data related to each instance being identifiable in one or more of the plural tables by the key value identifying that instance;

wherein the plural instances of the particular business object represent different subsets of data related to the particular business object such that the data related to different ones of the plural instances is at least partially different data;

means for identifying, according to the data model and the information received from the data management system, the plural tables associated with the particular business object;

for each of the plural instances of the particular business object, using the key value associated with that instance to identify, from the plural tables associated with the particular business object, the data in one or more of the plural tables that is related to that instance;

means for requesting from the data management system data to be retrieved included in the plural tables identified according to the data model, the requested data to be retrieved including at least a portion of the data identified as related to the plural instances of the particular business object; and means for communicating the data to an external system distinct from the data management system.

* * * * *